US006634692B1

(12) United States Patent
Barat et al.

(10) Patent No.: US 6,634,692 B1
(45) Date of Patent: Oct. 21, 2003

(54) ARRANGEMENT OF EQUIPMENT FOR A MOTOR VEHICLE AND DASHBOARD COMPRISING SAID ARRANGEMENT

(75) Inventors: Didier Barat, Meudon (FR); Andrew Nash, Clairfontaine (FR)

(73) Assignees: Valeo, Paris (FR); Visteon Systemes Interieurs, La Defense Cedex (FR)

( * ) Notice: Subject to any disclaimer, the term of this patent is extended or adjusted under 35 U.S.C. 154(b) by 0 days.

(21) Appl. No.: 09/959,497

(22) PCT Filed: Apr. 28, 2000

(86) PCT No.: PCT/FR00/01145

§ 371 (c)(1),
(2), (4) Date: Apr. 2, 2002

(87) PCT Pub. No.: WO00/66387

PCT Pub. Date: Nov. 9, 2000

(30) Foreign Application Priority Data

Apr. 28, 1999 (FR) .............................. 99 05567

(51) Int. Cl.[7] ................................................ B60R 7/06
(52) U.S. Cl. .................... 296/70; 296/37.12; 180/90
(58) Field of Search ..................... 296/70, 72, 37.1, 296/37.12, 37.8, 37.9, 24.1; 180/90; 248/27.1

(56) References Cited

U.S. PATENT DOCUMENTS

| 2,301,730 | A | * | 11/1942 | Mann ....................... 312/293.2 |
| 3,084,789 | A | * | 4/1963 | Kirby ........................ 296/37.9 |
| 4,231,625 | A | * | 11/1980 | Perez et al. ................. 312/245 |
| 4,423,812 | A | * | 1/1984 | Sato .......................... 296/37.8 |
| 4,706,810 | A | * | 11/1987 | Petrilli ......................... 296/70 |
| 4,733,898 | A | * | 3/1988 | Williams .................... 296/24.1 |
| 5,232,259 | A | * | 8/1993 | Booker ...................... 296/37.6 |
| 5,282,556 | A | * | 2/1994 | Bossert ...................... 296/37.8 |
| 5,381,940 | A | * | 1/1995 | Wright ........................ 224/542 |
| 5,393,137 | A | * | 2/1995 | Bivens et al. .............. 296/37.9 |
| 5,546,273 | A |   | 8/1996 | Harris |
| 5,636,682 | A |   | 6/1997 | Wolf |
| 5,715,978 | A | * | 2/1998 | Ackeret .................... 224/42.33 |
| 6,109,493 | A | * | 8/2000 | Bieri ....................... 296/37.12 |
| 6,338,517 | B1 | * | 1/2002 | Canni et al. ............... 296/37.8 |
| 6,394,526 | B1 | * | 5/2002 | Gyllenspetz ................. 296/70 |

FOREIGN PATENT DOCUMENTS

DE 36 37 390 A1 5/1988
DE 43 41 251 A1 6/1995

* cited by examiner

Primary Examiner—D. Glenn Dayoan
Assistant Examiner—G. Blankenship
(74) Attorney, Agent, or Firm—Young & Thompson

(57) ABSTRACT

An arrangement of equipment for a motor vehicle provided with at least one reserved space consisting of one or several side walls which are located between an opposing bottom and an opening. The reserved space in the arrangement accommodates a plurality of equipment elements respectively including at least one frame. The elements have dimensions that are equal to or multiples of a base and which fit into each other and/or do so against the side walls of the reserved space as a result of cooperation which occurs between first and second fastening devices which are provided on the frame of the elements and on the walls of the reserved space. The fixing devices are distributed in a regular manner according to the dimensions of the base.

11 Claims, 7 Drawing Sheets

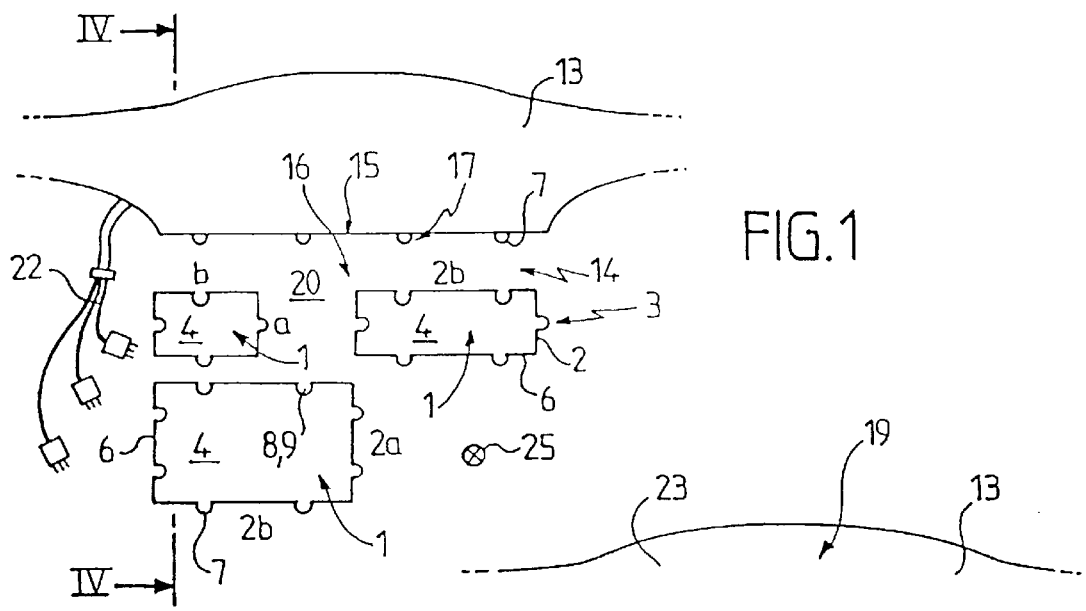
FIG.1
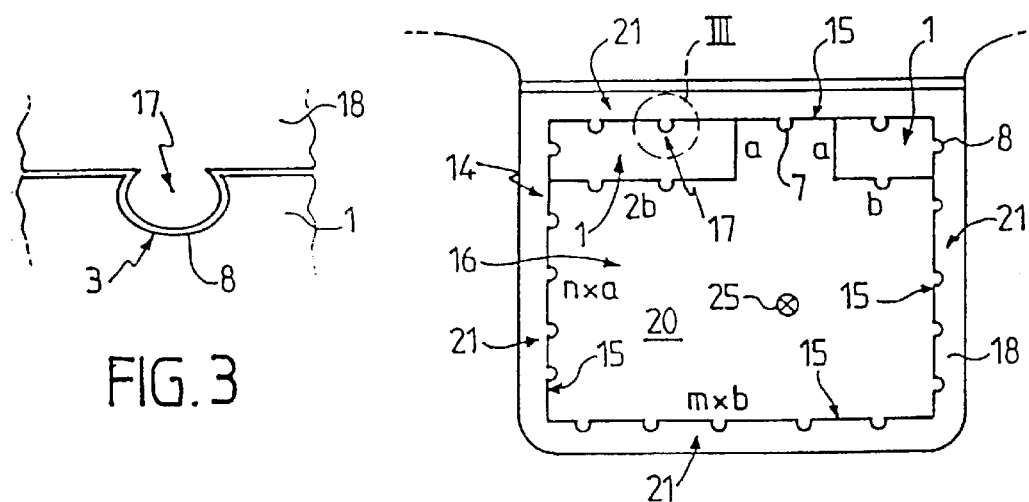
FIG.3
FIG.2
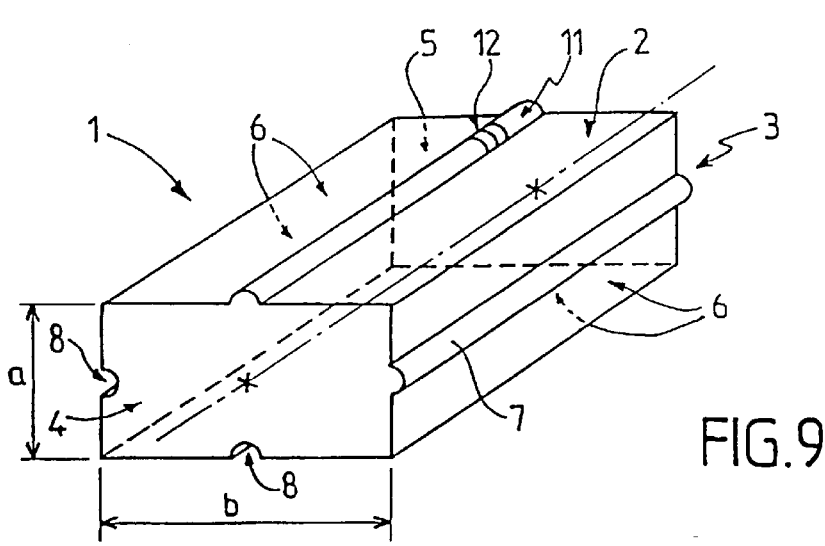
FIG.9

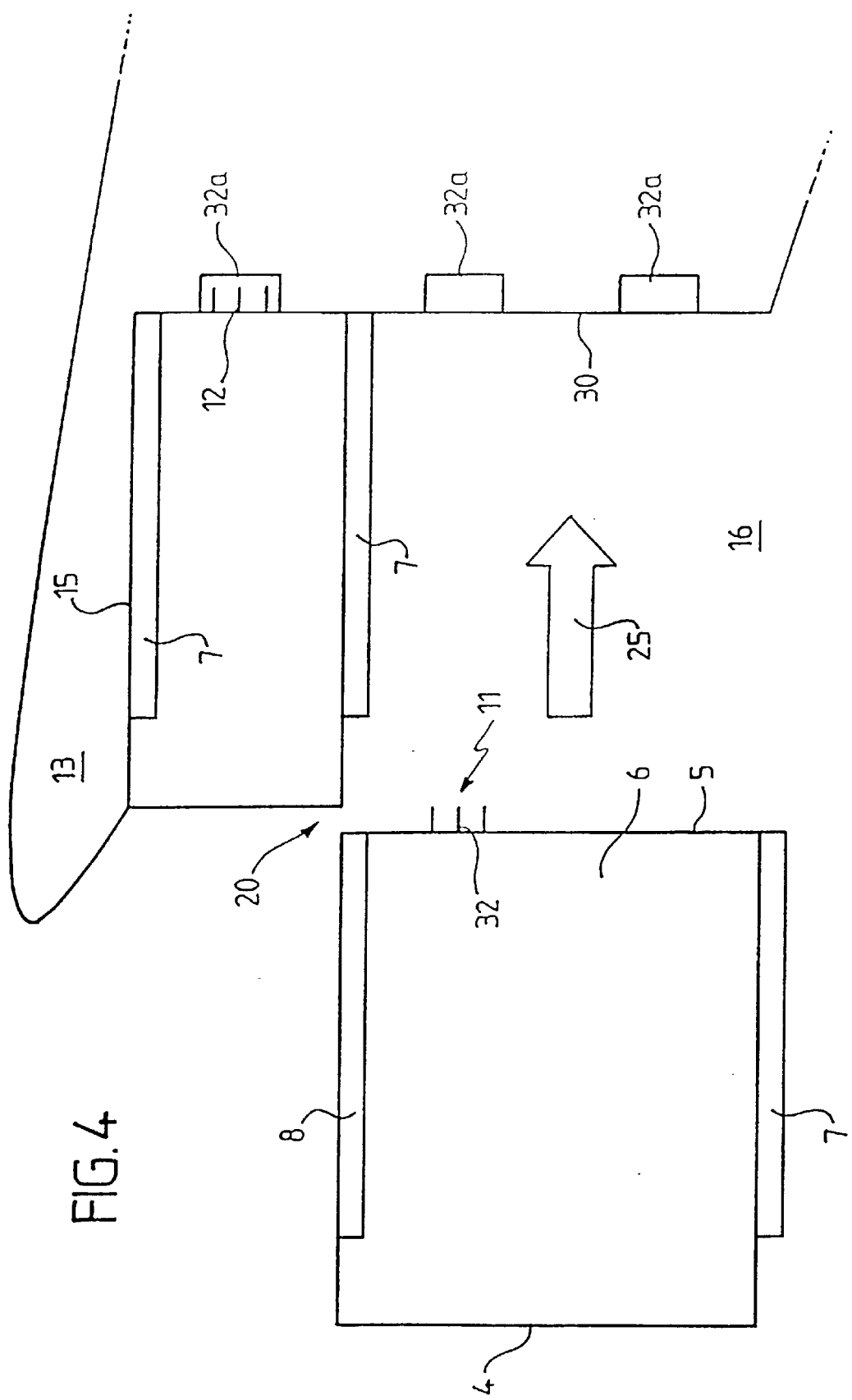

US 6,634,692 B1

ARRANGEMENT OF EQUIPMENT FOR A MOTOR VEHICLE AND DASHBOARD COMPRISING SAID ARRANGEMENT

BACKGROUND OF THE INVENTION

The invention relates to an arrangement of apparatus for a motor vehicle comprising at least one equipment element and a dashboard for a motor vehicle comprising such an arrangement of apparatus.

However, although more particularly intended to equip dashboards, the apparatus arrangement in accordance with the invention could likewise be installed within other assemblies or subassemblies of the interior passenger compartment of a motor vehicle.

In the motor-vehicle field, at the present time, dashboards are known which are equipped with optional equipment elements such as various types of boxes intended for storage, for cassette and compact-disc players, control panels for air-conditioning devices, alphanumeric keyboards, various types of electrical and/or other outlets.

A first drawback of these dashboards is that the fixing solutions used to integrate their optional equipment elements are specific to them, which increases the number of pieces and the fitting operations to be carried out, thus penalising their cost.

Furthermore, the relative dimensions of these equipment elements are not matched to one another, which most often gives rise to wasting of space and thus limits the total number of equipment elements capable of being installed.

In order to rationalise the fitting of optional equipment elements in the dashboards, it has been proposed to provide reserved spaces fitted with standard housings configured in advance for one or more given types of equipment elements. The housings are then occupied or not occupied depending on the position of the vehicle in the range.

Nevertheless, such reserved spaces are dedicated to given equipment elements and therefore require adaptations when it is a matter of housing an equipment element not provided for.

SUMMARY OF THE INVENTION

The object of the present invention is to propose an arrangement of apparatus for a motor vehicle comprising at least one equipment element and a dashboard for a motor vehicle including such an arrangement of apparatus which remedies the abovementioned drawbacks and the development and/or the fitting of which is facilitated.

Another object of the present invention is to propose an arrangement of apparatus for a motor vehicle comprising at least one equipment element and a dashboard for a motor vehicle comprising such an arrangement of apparatus, the size of which is optimised.

Another object of the present invention is to propose an arrangement of apparatus for a motor vehicle comprising at least one equipment element and a dashboard for a motor vehicle comprising such an arrangement of apparatus the use and/or the composition of which are more modular, during manufacture as well as at the moment of or after purchase.

Other objects and advantages of the invention will emerge in the course of the description which will follow, which is given only by way of indication and which is not for the purpose of limiting it.

The invention first of all relates to an arrangement of apparatus for a motor vehicle, which is equipped with at least one reserved space featuring, between a back wall and an opposite aperture, an axis, called longitudinal axis, and one or more side walls substantially parallel to the longitudinal axis, and in which arrangement:

the reserved space houses a plurality of equipment elements each comprising at least one chassis, equipped with first fixing means, the chassis featuring at least one side face, substantially parallel to the longitudinal axis and in which elements:

at least one of the side face or faces, called standard face, features a given dimension, called basic dimension, or a multiple of the basic dimension, in its direction orthogonal to the longitudinal axis, called standard direction, the fixing means are provided regularly at least in the case of some of them, on the standard side face or faces, along its or their standard direction as a function of the basic dimension or dimensions, at least a part of the wall or walls, called standard walls, features dimensions corresponding to one or to multiples of the basic dimension or dimensions of the equipment items, in its or their direction substantially parallel to the standard direction or directions of the equipment items, at least the standard wall or walls is or are equipped, at least in the case of some of them, with second fixing means, distributed regularly as a function of the basic dimension or dimensions, and able to interact with the first means for fixing the equipment items, designed to be fastened together and/or to the walls, individually, so as to be removable, one beside and/or above the others.

The invention further relates to a dashboard for a motor vehicle comprising an arrangement of apparatus as described above.

BRIEF DESCRIPTION OF THE DRAWINGS

The invention will be better understood on reading the following description, accompanied by the drawings in the annex which form an integral part of it, and among which:

FIG. 1, in front view, describes a first embodiment example of the arrangement of apparatus in accordance with the invention, FIG. 2, in the same view as in FIG. 1, describes a second embodiment example of the invention, FIG. 3 illustrates a detail, identified as III, in the preceding FIG. 2, FIGS. 4 to 8 are views in a section taken along the line IV—IV illustrated in the preceding FIG. 1, illustrating different variant embodiments, FIG. 6 illustrating a detail identified as VI in the preceding FIG. 5, FIG. 9 describes, in perspective, a first embodiment example of the equipment element for a motor vehicle used in the invention, FIG. 10 describes, in perspective, a second embodiment example of the equipment element for a motor vehicle used in the invention.

DETAILED DESCRIPTION OF THE EMBODIMENTS

Figure 5:
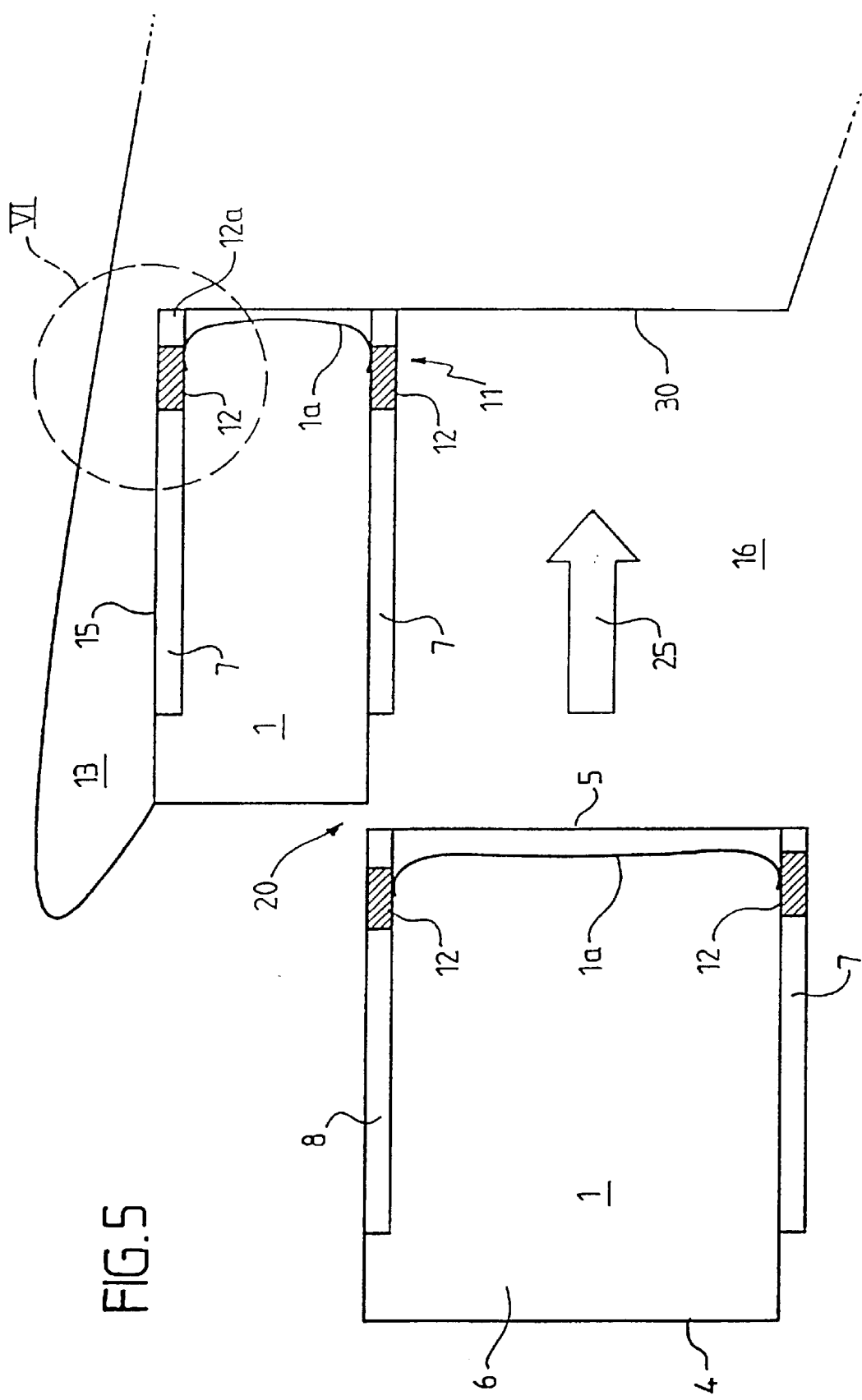

The invention first of all relates to an arrangement of apparatus for a motor vehicle.

As illustrated in FIGS. 1, 2 and 4 to 8, the arrangement is equipped with at least one reserved space 16 exhibiting, between a back wall 30, which is solid or otherwise, and an opposite aperture 20, an axis 25, called longitudinal axis, and one or more side walls 15, substantially parallel to the longitudinal axis.

In FIGS. 1 and 2, the axis 25 is perpendicular to the plane of the sheet of drawings. The term "longitudinal", however, does not pre-ordain either the orientation of the back wall and/or of the aperture of the reserved space 16, nor of its depth.

According to the invention, the reserved space houses a plurality of equipment elements 1, each consisting of at least one chassis 2, equipped with first fixing means 3.

Figure 10:
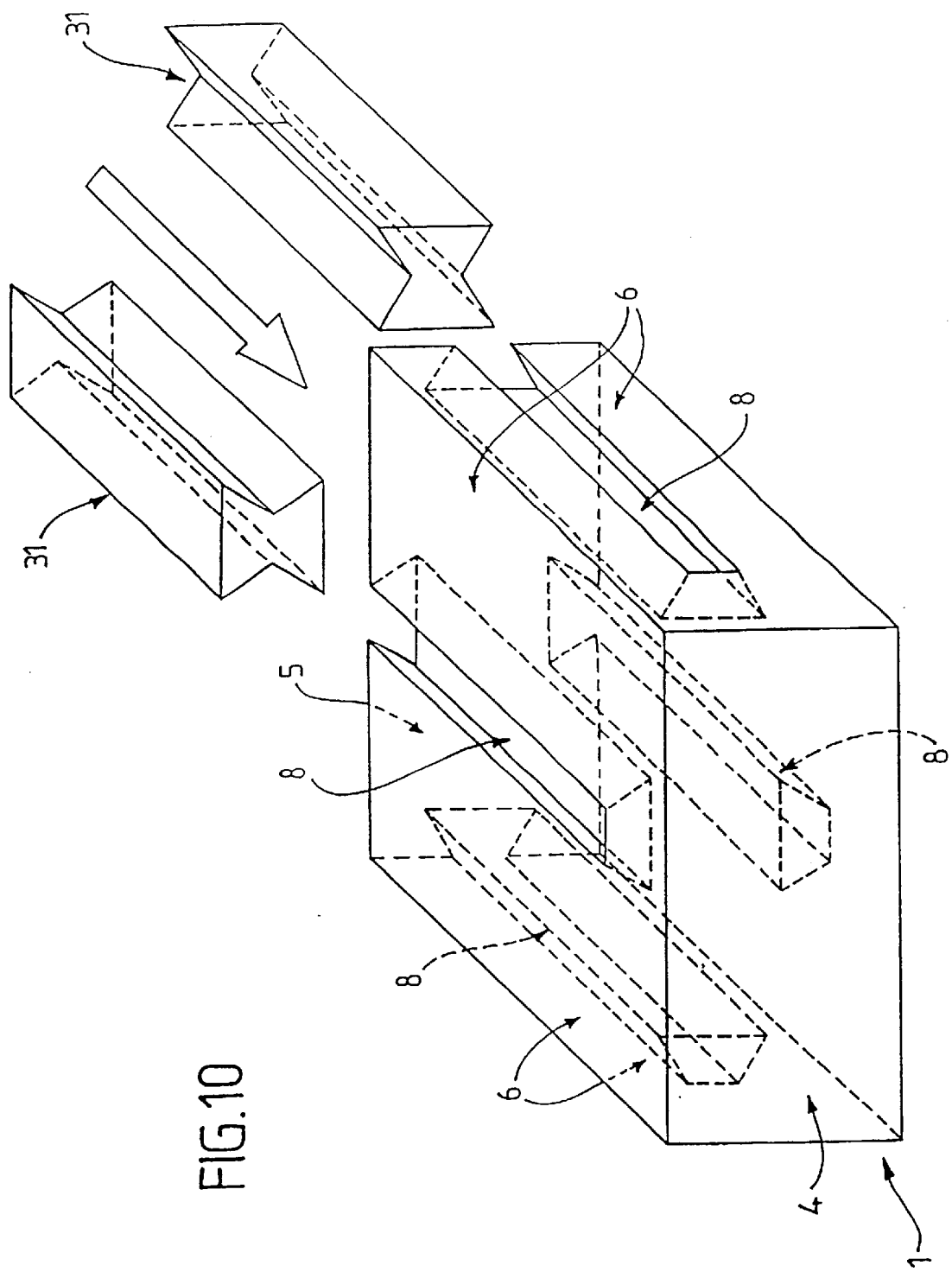

As illustrated in FIGS. 9 and 10, the chassis 2 features, for example, between a front face 4, open or otherwise, and a rear face 5, open or otherwise, called end faces, at least one side face 6, substantially parallel to the longitudinal axis 25, especially perpendicular to the end faces 4, 5. The front, rear and/or side faces 4, 5, 6 define the contour of the equipment elements 1, for example.

At least one of the side face or faces 6, called standard face, features a given dimension, called basic dimension, or a multiple of the said basic dimension, in its direction orthogonal to the longitudinal axis 25, called standard direction.

Furthermore, the first fixing means 3 are provided regularly, at least in the case of some of them, on the standard side face or faces 6, along its or their standard direction, as a function of the basic dimension or dimensions.

By "provided regularly" it is understood that the fixing means are distributed, especially, at regular intervals.

The equipment elements 1 in accordance with the invention thus feature one or more side faces 6, the dimensions of which are equal to one or more basic dimensions a, b or a multiple of the basic dimension or dimensions. In that way "bricks" are made up, of a greater or lesser size, but always equal to a multiple of the size of one basic brick exhibiting side faces with dimensions a, b.

On these bricks, the fixing means are distributed regularly on the basis of the basic dimensions a, b, either on the same equipment element 1, or by association of several said equipment elements.

The equipment elements 1 especially feature a housing, able to constitute a storage space and/or to house active, mechanical, electrical and/or electronic components, carrying out a given function.

These take the form, particularly, of ash trays, bins, storage of various kinds, especially for cassettes, compact discs, loose change, spectacles, credit cards, road maps, remote controls, pens, and/or others, cup holders, tablets or confectionery, and/or others.

These may also take the form, for example, of cassette or compact-disc players, badge readers, numerical, alphanumeric and/or other keyboards, current outlets, cigar lighter, data sockets, switches, telephone supports, electric torches and/or other things, handkerchief dispensers, compact-disc changers, electronics cards, and/or others.

The first fixing means 3 are provided, for example, at least partly in the bulk of the standard faces 6. They are therefore defined, especially, by the shape of the faces, which are intended to interact with forms in the negative shape.

The first fixing means 3 consist, for example, of ribs 7 and/or grooves 8, substantially parallel to the longitudinal axis 25, provided on at least a part of the length parallel to this latter one of the elements, which are intended to interact, by fitting together, respectively, with grooves or ribs, with substantially complementary profiles, situated, as set out below, within one or more neighbouring equipment elements 1 within the reserved space 16 and/or consisting of small bars 31.

As represented in FIG. 3, this is especially dovetailed in profile.

Referring again to FIGS. 1 and 2, it is observed that the ribs 7 and/or grooves 8 of the equipment elements 1 are spaced by a substantially constant distance between centres, equal to the corresponding basic dimension or to a fraction of the type 1/n, n being a natural integer, of the said basic dimension.

By way of non-limiting example, as illustrated in FIGS. 9 and 10, the chassis 2 constituting the equipment elements 1 in accordance with the invention exhibits a substantially rectangular box shape, each of its side faces 6 being a standard face equipped with fixing means 3 in the form of ribs 7 and/or of grooves 8, spaced mutually apart by the corresponding basic dimension a, b.

That being so, the chassis 2 possibly features means 11 for connection to a current-supply circuit intended to supply power, especially lighting, and/or for data distribution/acquisition. This may, for example, take the form of one or more electrical connectors, provided in the region of the end faces 4, 5 or side face 6 of the element 1.

They are provided, especially, regularly distributed as a function of the basic dimension or dimensions.

According to one embodiment illustrated in FIG. 4, the connection means 11 are situated at the rear of the equipment elements 1 and consist of a connector 32 which interacts with the connector 32*a* of the reserved space 16.

Figure 6:
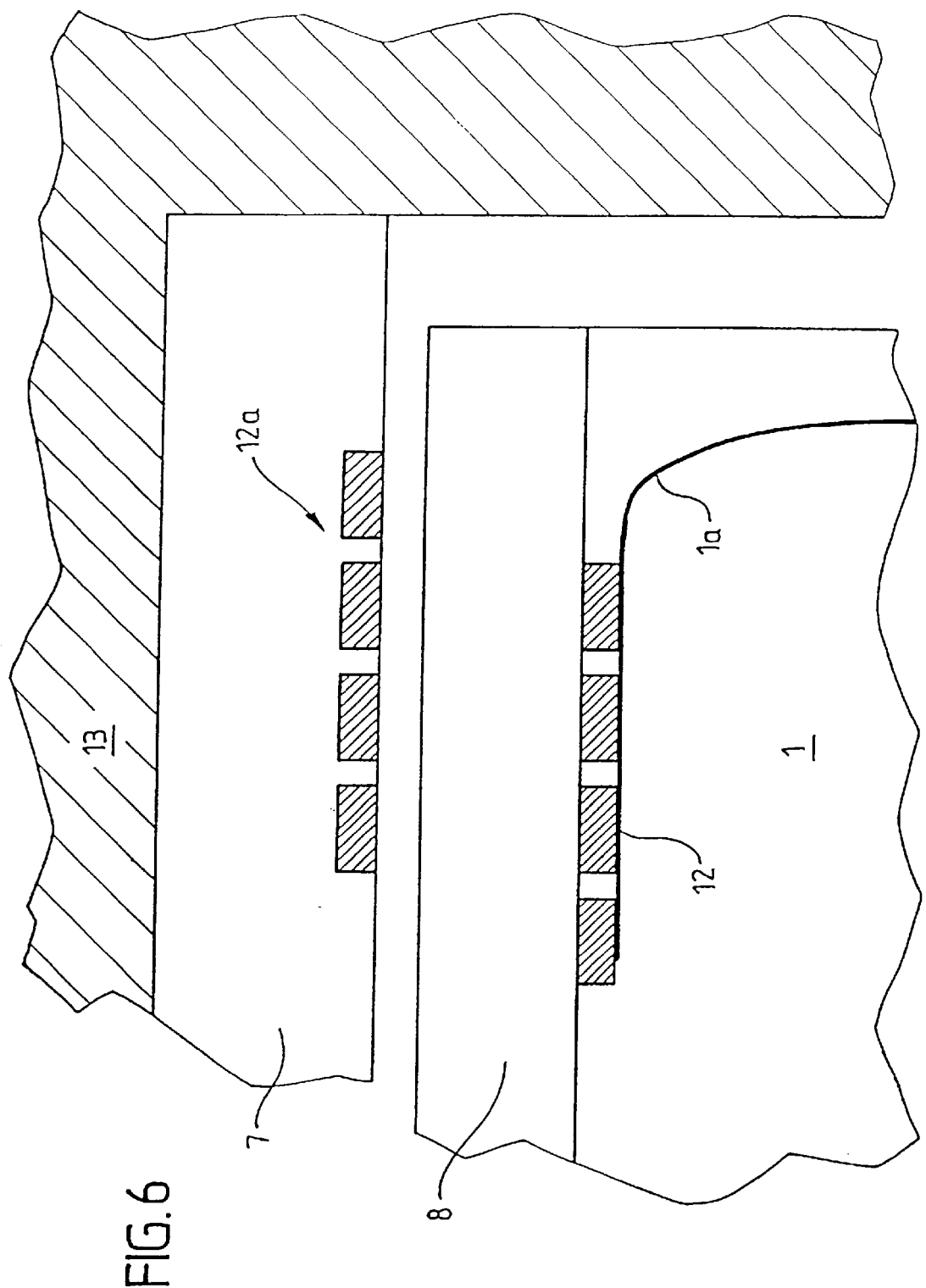

According to another particular embodiment illustrated in FIGS. 5 and 6, the connection means 11 are provided in the region of the aid fixing means 3 and are able to allow a current flow and/or data distribution/acquisition by way of at least one of the equipment elements 1, to the outside, especially to or from other equipment elements 1.

To that end, the equipment elements 1 are provided, for example, with a current-supply circuit 1*a* and/or a data distribution/acquisition circuit internally linking its connectors 12, provided in the region of at least two of its fixing means 3.

Referring again to FIGS. 1 and 2, it is observed that at least a part of the wall or walls 15 of the reserved space 16, called standard walls, features dimensions corresponding to one or multiples of the basic dimension or dimensions of the equipment 1, in its or their direction substantially parallel to the standard direction or directions of the equipment 1.

The standard wall or walls 15 are equipped, at least in the case of some of them, with second fixing means 17, regularly distributed on the basis of the basic dimension or dimensions a, b, able to interact with the first fixing means 3 of the equipment 1, these being provided fastened together and/or to the walls 15, individually, so as to be removable, one beside and/or above the others.

Thus an arrangement of apparatus is made available in a configuration which can easily be upgraded, of optimised size and of simple implementation.

The arrangement of apparatus in accordance with the invention consists, for example, of at least one reinforcement 13, equipped with support means 14 for the equipment elements 1, the reserved space 16 being provided in the region of the support means 14.

It will be noted that, when empty, the reinforcement 13 is equipped with at least one reserved space 16 the wall or walls 15 of which feature the fixing means 17, regularly spaced.

As illustrated in FIG. 1, according to a first variant embodiment, the support means 14 consist of one face of the amid reinforcement 13, defining one standard wall 15 of the reserved space 16 equipped with second fixing means.

As illustrated in FIG. 2, according to another embodiment, the support means 14 consist of a casing 18, able to be fastened to the rest 19 of the reinforcement.

The casing 18 features, for example, a back wall and an aperture 20 between which extend side faces 21 constituting the walls of the reserved space 16.

Referring again to FIG. 1, it is observed that the arrangement could, furthermore, possibly comprise a multiplexed circuit 22, especially for current supply and/or for data flow.

According to another embodiment, as already set out above, the current supply and/or the flow of data could be implemented by way of at least one of the equipment elements 1 itself, from at least one connection point provided in the region of one of the walls 15 of the reserved space 16. The use of conductors the fixing of which still remains a problem, or of connection rails on a back plane panel, is thereby avoided.

Figure 7:
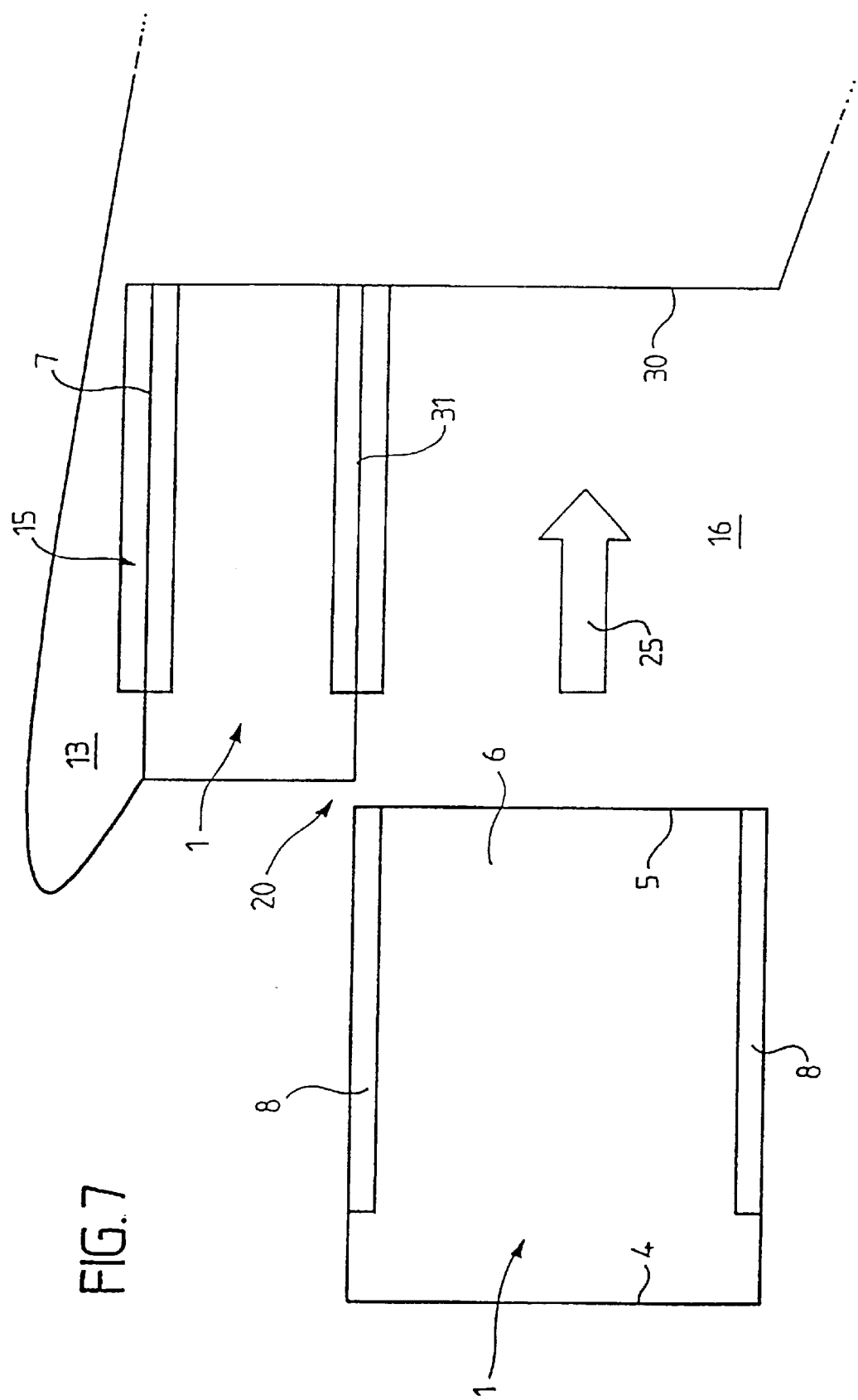

That being so, in the embodiment represented in FIG. 2, the grooves 8 formed on the inner wall 15 of the casing 18 are masked by a cover (not represented). In order to overcome this drawback, the variant represented in FIGS. 7 and 10 shows that:

the elements 1 include only grooves 8 on their side faces 6, the inner walls 15 of the reserved space 16 include only ribs 7, these grooves 8 are combined, when necessary, with profiled bars 31 which then make it possible not to have the grooves opening out on the front face.

Figure 8:
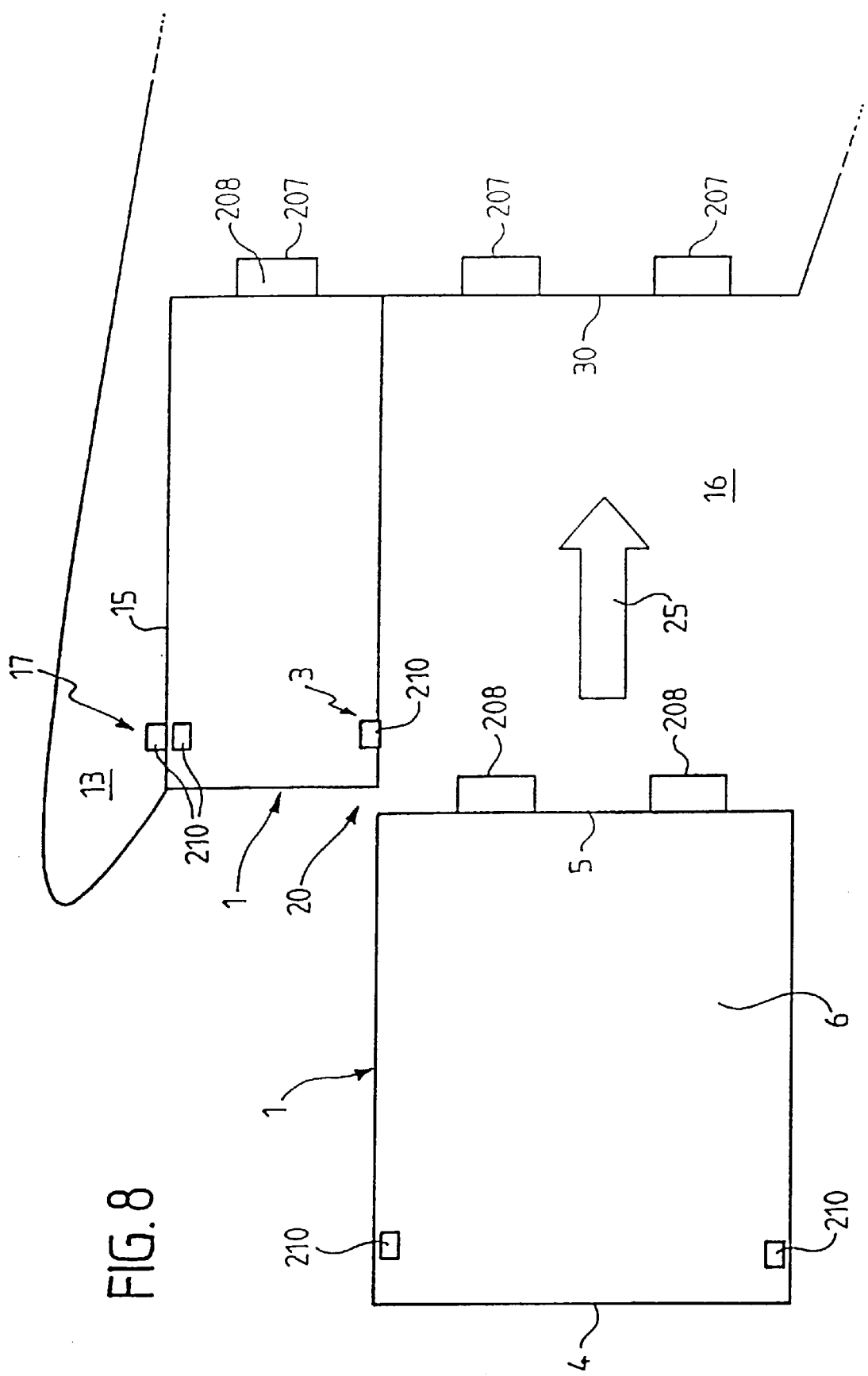

Another variant illustrated in FIG. 8 consists in providing, in the back wall of the reserved space 16, a plurality of housings 207 able to receive tenons 208 of the elements 1; said fixing means 3 are provided on the side faces 6 and possibly on the walls 15, such as clips 210, these means being located at the opposite end from the back wall of the reserved space 16, so as to balance the weight of the elements 1. The invention also relates to a dashboard for a motor vehicle comprising an arrangement of apparatus as described above. This is provided, especially, at the central part, the reserved space 16 being situated under the rest 19 of the reinforcement 13, designed to consist of a cover 23 of the dashboard, situated at the upper part.

Naturally, other embodiments, within the scope of the person skilled in the art, could have been envisaged without in any way departing from the context of the invention, especially the use of screws, rivets, clips, etc. located according to the invention at regular intervals as defined above for the standard walls.

What is claimed is:

1. Arrangement of apparatus for a motor vehicle, which is equipped with at least one reserved space featuring, between a back wall and an opposite aperture, an axis, called longitudinal axis, and one or more side walls substantially parallel to said longitudinal axis, and in which arrangement:

said reserved space houses a plurality of equipment elements each comprising at least one chassis, equipped with first means for fixing the equipment elements to the wall, said chassis features means for connection to a current-supply and/or data distribution/acquisition circuit, said means for connection being provided within said first means for fixing and able to allow a flow of current and/or distribution/acquisition of data by way of at least one of said equipment elements, said chassis featuring at least one side face, substantially parallel to the said longitudinal axis and wherein:

at least one of said side face or faces called standard face, features a given dimension, called basic dimension, or a multiple of said basic dimension, in its direction orthogonal to the longitudinal axis, called standard direction, said first means for fixing are provided regularly, on said standard side face or faces, along its or their standard direction as a function of the basic dimension or dimensions, at least a part of the said wall or walls, called standard wall, features dimensions corresponding to one or to multiples of the basic dimension or dimensions of said equipment elements, in its or their direction substantially parallel to the standard direction or directions of the said equipment elements, at least the standard wall or walls is or are equipped, with second means for fixing the equipment elements to the wall, distributed regularly as a function of the basic dimension or dimensions, and able to interact with the first means for fixing the equipment elements, designed to be fastened together and/or to the said walls, individually, so as to be removable, one beside and/or above the others.

2. Arrangement according to claim 1, wherein said first means for fixing are provided at least partly in a central portion of said standard face or faces.

3. Arrangement according to claim 1, wherein said first means for fixing consists of ribs and/or grooves, substantially parallel to said longitudinal axis, provided on at least a part of the length parallel to this latter one of said elements, which are intended to interact, by fitting together, respectively, with grooves or ribs, with substantially complementary profiles.

4. Arrangement according to claim 1, in which said means for connection are distributed regularly on the basis of said basic dimension or dimensions.

5. Arrangement according to claim 1, consisting at least of a reinforcement, equipped with means for support of said equipment elements, said reserved space being provided in the region of the said means for support.

6. Arrangement according to claim 5, wherein said means for support consists of one face of said reinforcement; defining one said standard wall of the reserved space equipped with said second means for fixing.

7. Arrangement according to claim 5, wherein said means for support consists of a casing, able to be fastened to part of said reinforcement.

8. Arrangement according to claim 7, wherein said casing features a back wall and an aperture between which extends side faces constituting side walls of the reserved space.

9. Dashboard for a motor vehicle comprising an arrangement of apparatus according to claim 1.

10. An arrangement of an apparatus for a motor vehicle having at least one reserved space defined by at least one wall, arrangement comprising:

at least one equipment element having a chassis with first means for fixing said at least one equipment element to the wall provided regularly on a face of said chassis, said chassis having means for connection to at least one of a current-supply and a data distribution/acquisition circuit, said means for connection being within said first means for fixing enabling a flow of at least one of current and distribution/acquisition of data by way of said at least one equipment element, said at least one wall having dimensions corresponding to a basic dimension of said at least one equipment element, in a direction substantially parallel to a direction orthogonal to a longitudinal axis of said at least one reserved space, said at least one wall having a second means for fixing said at least one equipment element to the wall, distributed regularly as a function of the basic dimension and able to interact with the first means for fixing, so that said at least one equipment element is removable from said at least one wall.

11. The arrangement according to claim 10, wherein said first means for fixing are one of ribs and grooves provided on at least part of a length of said element substantially parallel to the longitudinal axis, and interact with complimentary grooves or ribs.

* * * * *